United States Patent
Ahn et al.

(10) Patent No.: US 8,321,539 B2
(45) Date of Patent: Nov. 27, 2012

(54) PEER-TO-PEER (P2P) NETWORK SYSTEM AND METHOD OF OPERATING THE SAME

(75) Inventors: Jae-min Ahn, Seoul (KR); Ji-yon Han, Seoul (KR); Jeonghwa Song, Suwon-si (KR); Uram H. Yoon, Seoul (KR); Keon-il Jeong, Seongnam-si (KR); Eo-hyung Lee, Seoul (KR); Kyung-lang Park, Seoul (KR); Shin-dug Kim, Goyang-si (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 77 days.

(21) Appl. No.: 12/431,080

(22) Filed: Apr. 28, 2009

(65) Prior Publication Data
US 2009/0276507 A1    Nov. 5, 2009

(30) Foreign Application Priority Data

Apr. 30, 2008    (KR) .................. 10-2008-040799

(51) Int. Cl.
*G06F 15/16*    (2006.01)
(52) U.S. Cl. ..................... 709/220; 709/203
(58) Field of Classification Search ............... 709/220, 709/203, 223
See application file for complete search history.

(56) References Cited

U.S. PATENT DOCUMENTS

| | | | |
|---|---|---|---|
| 7,177,951 B1* | 2/2007 | Dykeman et al. | 709/249 |
| 7,266,158 B2* | 9/2007 | Matsumura | 375/295 |
| 2002/0154613 A1 | 10/2002 | Shahrier | |
| 2004/0083263 A1 | 4/2004 | Richardson et al. | |
| 2005/0128958 A1* | 6/2005 | Hamdan | 370/254 |
| 2006/0165014 A1* | 7/2006 | Ikeda | 370/254 |
| 2008/0168394 A1* | 7/2008 | Kawasaki | 715/811 |
| 2008/0288580 A1* | 11/2008 | Wang et al. | 709/203 |

FOREIGN PATENT DOCUMENTS

| | | |
|---|---|---|
| JP | 2002-271842 | 9/2002 |
| JP | 2004-201116 | 7/2004 |

* cited by examiner

*Primary Examiner* — Ario Etienne
*Assistant Examiner* — El Hadji Sall
(74) *Attorney, Agent, or Firm* — NSIP Law

(57) ABSTRACT

A peer-to-peer (P2P) network system and a method of operating the P2P network system are provided. The P2P network system includes at least one edge peer storing resources and at least one super peer sharing and managing resource information corresponding to the resources of the at least one edge peer. By updating changes in characteristics of peers due to elimination and movement of any one of a plurality of edge peers and super peers included in the P2P network, path reconfiguration may be performed efficiently.

23 Claims, 7 Drawing Sheets

PEER-TO-PEER (P2P) NETWORK SYSTEM AND METHOD OF OPERATING THE SAME

CROSS-REFERENCE TO RELATED APPLICATION(S)

This application claims the benefit under 35 U.S.C. §119 (a) of Korean Patent Application No. 10-2008-0040799, filed on Apr. 30, 2008 in the Korean Intellectual Property Office, the disclosure of which is incorporated herein in its entirety by reference.

BACKGROUND

1. Field

The following description relates to a network system, and more particularly, to a peer-to-peer (P2P) network system and a method of operating the same.

2. Description of the Related Art

Development of wired and wireless Internet technology has led to the emergence of systems for sharing resources through the Internet. Such resource sharing systems adopt peer-to-peer (P2P) technology as networking technology to share resources. A P2P system includes a plurality of peers that are connected to each other through a network, wherein each peer may store at least one resource, such as software and content, and the peers may share these resources through the network.

A P2P system is based on hybrid P2P architecture or pure P2P architecture. In the hybrid P2P architecture, peers of a network are connected to a central sever and share their resources through the central server. Meanwhile, in the pure P2P architecture, peers are connected directly to each other to share their resources. In particular, the hybrid P2P architecture has an advantage of more easily solving problems related to peer power management and network updating by using the central server to manage the peers.

However, since the hybrid P2P architecture was designed in reference to fixed peers, there are difficulties in sharing resources upon movement or elimination of peers. Accordingly, a network operating system for sharing resources upon movement or elimination of peers may be advantageous.

SUMMARY

In one general aspect, a peer-to-peer (P2P) network system includes at least one edge peer for storing resources; at least one super peer for classifying resource information for the resources of the at least one edge peer, for distributing the classified resource information, and for managing the distributed resource information, wherein the at least one edge peer is registered and connected with the at least one super peer, the at least one super peer generates super peer history information including information regarding a path for a request edge peer to request a resource to a destination edge peer connected to the at least one super peer, and the resource is stored in the at least one edge peer.

The super peer history information may include an address information area of the request edge peer for storing a name and an address of the request edge peer; an address information area of the destination edge peer for storing a name and an address of the destination edge peer; and a count area for storing a count value, the count value representing at least one of frequency at which the super peer history information is generated when the request edge peer requests the resource.

The at least one super peer may verifies a count value of every component of the super peer history information at a regular time interval, and delete the component of super peer history information having a smallest count value.

The address information area of the request edge peer may include an IP address and port address of the request edge peer, and the address information area of the destination edge peer may include an IP address and port address of the destination edge peer.

The at least one super peer may transmit, at a regular time interval, stored super peer history information to the at least one edge peer.

The request edge peer may generate edge peer history information including a name, an IP address, and a port address of the destination edge peer; and a count value representing a number of frequencies at which the request edge peer requests the resource to the destination edge peer.

The at least one edge peer may verify a count value of every component of the edge peer history information at a regular time interval and delete the component of edge peer history information having a smallest count value.

When the request edge peer is unregistered and disconnected from a previous super peer with which the request edge peer was previously registered and connected and then is registered and connected with another super peer, edge peer history information of the destination edge peer, history information of the previous super peer, and history information of the other super peer may be updated.

When the destination edge peer is unregistered and disconnected from a previous super peer with which the destination edge peer was previously registered and connected and then is registered and connected with another super peer, edge peer history information of the request edge peer, history information of a super peer with which the request edge peer is registered and connected, edge peer history information of the destination edge peer, history information of the previous super peer, and history information of the other super peer may be updated.

When a super peer of the at least one super peer no longer manages edge peers connected with the super peer, at least one edge peer of the edge peers connected with the super peer is elected as a new super peer and history information of a super peer connected with the new super peer may be updated.

In another general aspect, a method of operating a peer-to-peer (P2P) network system includes at least one edge peer, for storing resources, being registered and connected with at least super peer, wherein the at least one super peer classifies resource information for the resources of the at least one edge peer, distributes the classified resource information with each other, and manages the distributed resource information; a request edge peer among the at least one edge peer for transmitting a query for requesting a resource to a destination edge peer storing the resource, through a request super peer with which the request edge peer is connected and a destination super peer with which the destination edge peer is connected and which manages the destination edge peer; and the request super peer and the destination super peer generate and store super peer history information including information regarding a path through which the resource is requested, based on the query from the request edge peer.

The generating and storing of the super peer history information may include writing address information of the request edge peer, including a name and an address of the request edge peer; writing address information of the destination edge peer, including a name and an address of the destination edge peer; writing a count value representing at least one frequency at which the super peer history information is generated when the request edge peer requests the resource.

The at least one super peer may verify a count value of every component of the super peer history information at a regular time interval; and the at least one super peer may delete the component of super peer history information having a smallest count value.

The address information area of the request edge peer may include an IP address and a port address of the request edge peer, and the address information area of the destination edge peer may include an IP address and a port address of the destination edge peer.

The at least one super peer may transmit, at a regular time interval, stored super peer history information to the at least one edge peer.

The request edge peer may generate edge peer history information for the destination edge peer.

The generating of the edge peer history information may include the request edge peer performing at least one selected from writing a name of the destination edge peer; writing an IP address of the destination edge peer; writing a port address of the destination edge peer; writing a count value representing at least one frequency at which the edge peer history information is generated when the request edge peer requests the resource; and any combination thereof.

The at least one edge peer may verify a count value of every component of the edge peer history information at a regular time interval, and delete the component of edge peer history information having a smallest count value.

When the request edge peer is unregistered and disconnected from a previous super peer with which the request edge peer was previously registered and connected and then is registered and connected with another super peer, edge peer history information of the destination edge peer, history information of the previous super peer, and history information of the other super peer may be updated.

When the destination edge peer is unregistered and disconnected from a previous super peer with which the destination edge peer was previously registered and connected and then is registered and connected with another super peer, edge peer history information of the request edge peer, history information of a super peer with which the request edge peer is registered and connected, edge peer history information of the destination edge peer, history information of the previous super peer, and history information of the other super peer may be updated.

Other features and aspects will be apparent from the following detailed description, the drawings, and the claims.

Figure 1:
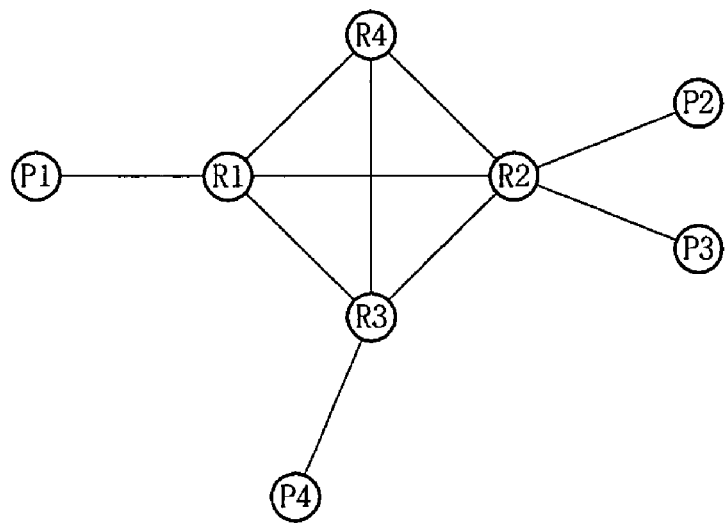
FIG. 1 is a diagram schematically showing an exemplary configuration of a P2P network system.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions may be omitted for increased clarity and conciseness.

In the following description, a P2P network is based on hybrid P2P architecture in which the P2P network includes edge peers that exchange resources and super peers that manage the edge peers. That is, in the hybrid P2P architecture, a plurality of edge peers are each connected to a corresponding one of a plurality of interconnected super peers, and the edge peers share resources with each other through at least one super peer.

In the following description, the term "resource" describes hardware, software, content, and the like. For example, a resource may be an MP3 file, a picture file, a motion picture file, or similar file. Such a resource may be generated and regenerated using various functions included in the peers. For example, if a peer includes a camera module capable of capturing images of objects, images collected using the camera module may be resources of the peer.

The term "peer" describes a node in the P2P network, physically corresponding to a terminal of the network system. A peer may be a mobile communication terminal, a personal computer (PC), or the like. The term "edge peer" describes a terminal that may generate and store information independently. Edge peers may share their resources by transmitting resources to or receiving resources from other edge peers. The term "super peer" describes a terminal which manages edge peers. Super peers are connected to each other. In other words, super peers may share resource information stored in each edge peer by sharing information regarding edge peers connected to themselves. Super peers may manage edge peers in the form of a list and may manage resource information of edge peers in the form of a table. In the following description, exemplary edge peers have mobility and exemplary super peers have limited mobility. However, some edge peers may have limited mobility and some super peers may have mobility.

In the following description, the term "resource information" describes characteristic information of resources. Such resource information includes the names of resources, identifiers of locations at which resources are stored, and the like.

Also, in the following description, history information includes information regarding registrations and connections between peers, log information about paths between the peers, and the like. For example, history information includes the names, IP addresses, port addresses, and hop counts of peers. That is, history information may include information regarding peers having searched for resources from other peers.

In the following description, history information includes edge peer history information generated by edge peers and super peer history information generated by super peers. Identifiers of edge peers and super peers are described with respect to history information. Hereinafter, edge peer history information of a first edge peer (P1) is referred to as P1 history information, and super peer history information of a first super peer (R1) is referred to as R1 history information.

Also, in the following description, edge peers may be classified into request edge peers and destination edge peers depending on whether they request or provide resources. That is, a destination edge peer stores resources searched for by a request edge peer, and the request edge peer transmits a query to the destination edge peer through a super peer connected to the request edge peer, for receiving the resources stored in the destination edge peer. Here, a super peer managing a destination edge peer may be referred to as a destination super peer, and a super peer managing a request edge peer may be referred to as a request super peer.

FIG. 1 is a diagram schematically showing an exemplary configuration of a P2P network system.

Referring to FIG. 1, the P2P network system includes a plurality of peers, wherein the peers are classified into a plurality of edge peers P1, P2, P3 and P4 and a plurality of super peers R1 R2, R3 and R4, according to their roles.

The first through fourth edge peers P1 through P4, as child edge peers, are each registered and connected with a corresponding one of the first through fourth super peers R1 through R4. Also, each of the first through fourth edge peers P1 through P4 registers resource information regarding its resources with the corresponding super peer. Accordingly, the super peer may determine resources stored in its child edge peers. For simplicity, in one example an edge peer is registered and connected with a super peer. The first through fourth edge peers P1, P2, P3 and P4 may individually generate and store resources. Specifically, the first through fourth edge peers P1 through P4 may store history information regarding registered and connected super peers.

The first through fourth super peers R1 through R4 are interconnected. Each of the first through fourth super peers R1 through R4 collects resource information of interconnected edge peers, classifies the collected resource information, and distributes the classified resource information to at least one of the other super peers. Each of the first through fourth super peers R1 through R4 stores and manages resource information received from the other super peers. Each of the first through fourth super peers R1 through R4 may classify resource information stored in its child edge peers using a hash function, and distribute the classified resource information in predetermined amounts to the other super peers, thereby managing the resource information. For example, if the total number of resource information pieces of edge peers is 100 and there are four super peers (for example, first through fourth super peers R1 through R4), resource information indexed from 1 to 25 is distributed to the first super peer R1, resource information indexed from 26 to 50 is distributed to the second super peer R2, resource information indexed from 51 to 75 is distributed to the third super peer R3, and resource information indexed from 76 to 100 is distributed to the fourth super peer R4. That is, the super peers R1 through R4 may manage the resource information so that the resource information pieces are indexed from 1 to 100 using the hash function. For resource management, the super peers R1 through R4 may include at least one super peer having an indexing function and at least one super peer for receiving, storing and managing indexes.

Through the above operations, each of the first through fourth super peers R1 through R4 may determine the locations of resource information of interconnected and registered edge peers. Accordingly, in the P2P network, the first through fourth super peers R1 through R4 may distributively manage resource information regarding resources stored in their edge peers. Therefore, the first through fourth edge peers P1 through P4 may share their resources through the first through fourth super peers R1 through R4. In particular, the first through fourth super peers R1 through R4 each may store history information regarding their correlation, history information regarding registrations and connections between respective child edge peers, history information regarding an edge peer connected to itself that has searched for resources in other edge peers, among other information.

The history information will be described with reference to Tables 1 and 2, below. Table 1 illustrates one example of a data structure of history information stored in a super peer (for example, one of the first through fourth super peers R1 through R4).

TABLE 1

| Requestor | | | Destination | | | |
|---|---|---|---|---|---|---|
| Name | IP | Port | Name | IP | Port | Count |
| ... | ... | ... | ... | ... | ... | ... |

An operation for generating history information by a super peer will be described with reference to Table 1. If a super peer receives a query for requesting a specific resource from an edge peer, the super peer generates history information for the edge peer. If the edge peer is a child edge peer of the super peer, the super peer writes information of the child edge peer under "Requestor", writes information of a destination edge peer under "Destination", and sets "Count" in Table 1 to zero. If the super peer receives a query for requesting a specific resource from another super peer (e.g., instead of an edge peer) and searches for the requested resource in its child edge peers, or if the super peer receives a query for requesting a specific resource from another super peer and transmits the query to a different super peer, the super peer writes information of the other super peer under "Requestor", writes information of a destination edge peer or a destination super peer under "Destination", and sets "Count" to zero.

If overlapping information is stored in certain areas of the history information, a plurality of peers are requesting the same resource. By increasing a count value written under "Count", the number of queries for requesting the corresponding resource may be counted. Accordingly, the super peer may minimize the frequency at which the corresponding resource is searched for according to the "Count" component of the history information. Since history information may be arranged according to times at which resources are requested, a weighting may be allocated to the latest generated information to increase efficiency in management of history information. For example, a super peer may manage its history information to delete the oldest history information if the amount of stored history information exceeds a predetermined value. The super peer considers history information with the smallest result value as the oldest history information and removes it by allocating point values to the respective history information according to times at which they are generated. That is, the super peer allocates a point "1" to the oldest history information and allocates a point corresponding to the total number of the history information to the latest history information. The super peer multiplies the allocated point value of each history information by the corresponding count value.

Table 2 illustrates one example of a data structure of history information generated and stored by an edge peer.

TABLE 2

| Name | IP | Port | Count |
|------|-----|------|-------|
| ... | ... | ... | ... |

As illustrated in Table 2, each edge peer generates and manages history information in a data structure simpler than that of a super peer. Hereinafter, operations for an edge peer generating history information based on the data structure illustrated in Table 2 will be described. An edge peer generates history information regarding a peer which responds to a query provided by the edge peer, and maintains and manages the history information. The edge peer may maintain the latest information by deleting old information, similar to the above-described operation for managing history information by a super peer, in order to reduce loads in storing and managing history information by limiting the number of pieces of history information that are to be managed. The history information is stored in a cache included in hardware of the edge peer.

As described above, since each peer included in the P2P network stores, as its history information, information regarding other interconnected peers and information regarding the peer searching for resources stored in other peers, the peer may perform resource searching efficiently.

Updating of history information in the P2P network is described below for when an edge peer newly enters the P2P network, when an edge peer which has transmitted a query for requesting resource information moves, when an edge peer whose resource information has been searched for by another edge peer moves, when an edge peer is elected as a new super peer due to elimination of a super peer, and the like.

Figure 2:
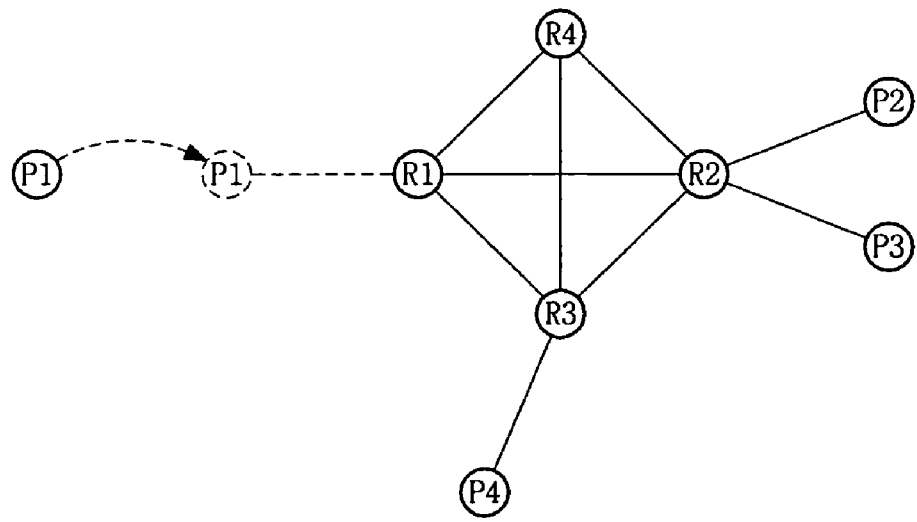
FIG. 2 illustrates an exemplary network configuration for describing generation of history information.
Figure 3:
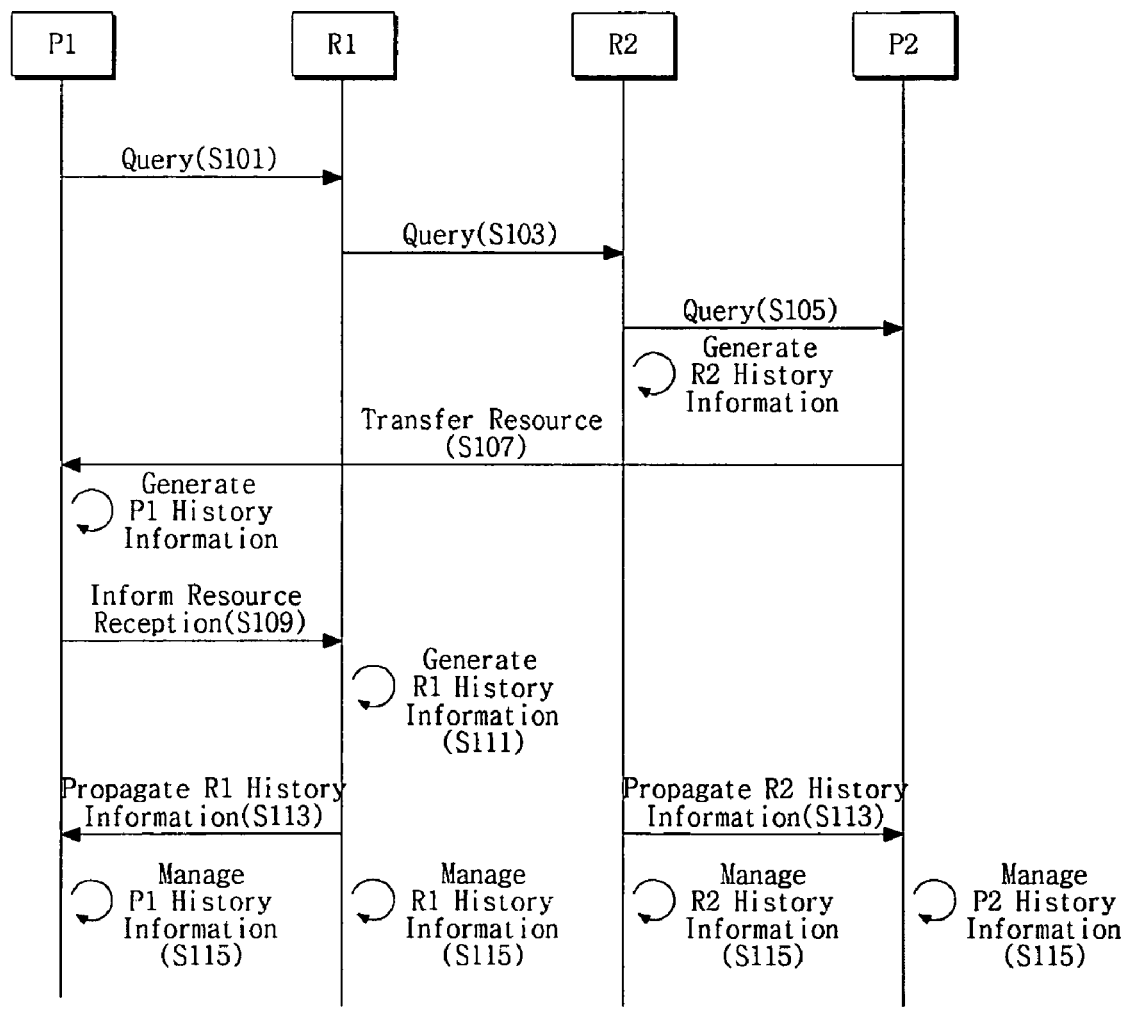
FIG. 3 illustrates exemplary signal flow in a network configuration for describing generation of history information.
Figure 4:
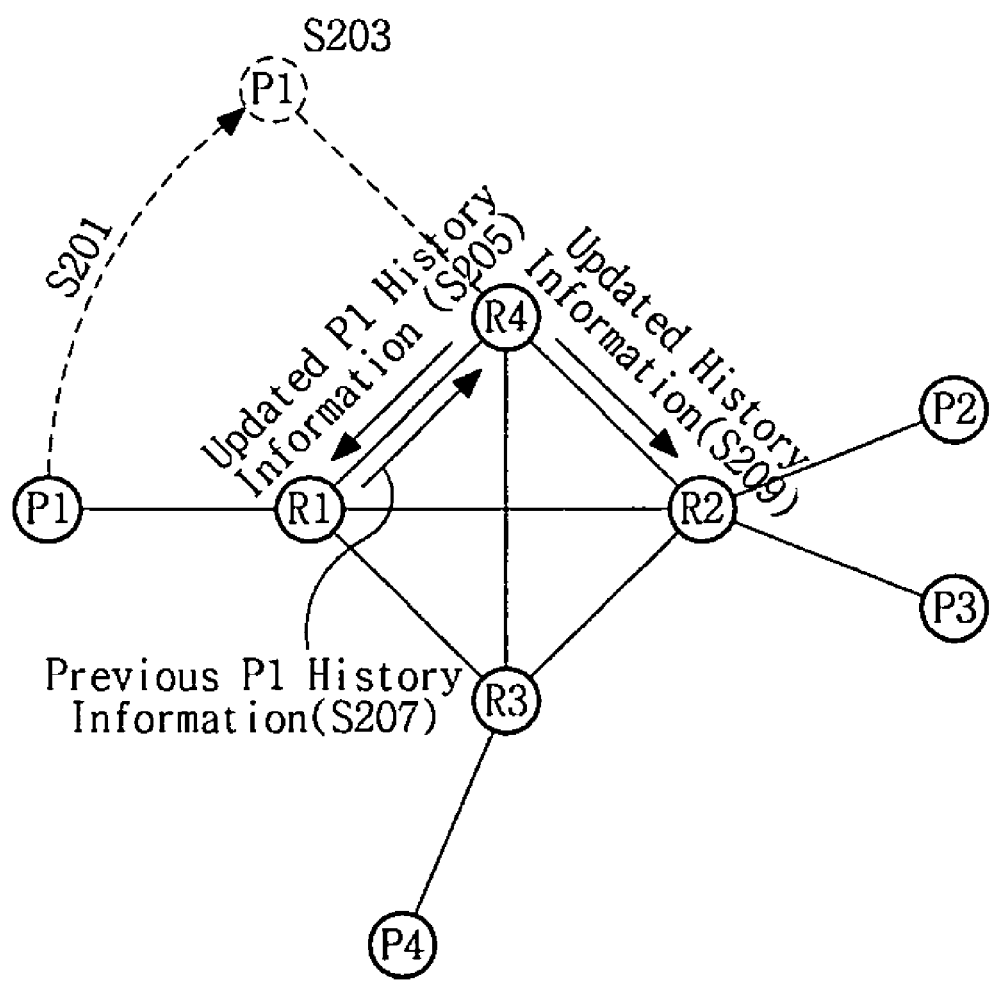
FIG. 4 illustrates an exemplary network configuration for describing updating of history information when a request edge peer moves.

FIGS. 2, 3 and 4 are views for describing an exemplary operation of updating history information when an edge peer enters a P2P network.

In the following description, a P2P network includes first through fourth edge peers P1 through P4 and first through fourth super peers R1 through R4, wherein the first edge peer P1 acts as a request edge peer which requests a resource to the second edge peer P2, accordingly the second edge peer P2 is a destination edge peer with respect to the first edge peer P1, the first super peer R1 is a request super peer as it manages the first edge peer P1 as its child edge peer, and the second super peer R2 is a destination super peer as it manages the second edge peer P2 as its child edge peer. Also, history information generated by the first edge peer P1 is referred to as P1 history information, history information generated by the first super peer R1 is referred to as R1 history information, history information generated by the second super peer R2 is referred to as R2 history information, and history information generated by the second edge peer P2 is referred to as P2 history information.

Referring to FIG. 2, the first edge peer P1 may be registered and connected with the first super peer R1 when the first edge peer P1 enters the P2P network or when the P2P network recognizes the first edge peer P1 as a new edge peer upon resuming power. The first edge peer P1 may be registered and connected with the third and fourth super peers R3 and R4. However, the first edge peer P1 may be registered and connected with the first super peer R1 physically located at the shortest distance and accordingly having a higher probability of better communications, according to a protocol applied to the P2P network. Here, the first edge peer P1 generates P1 history information by collecting "Name", "IP" and "Port" information of the first super peer R1, and initializes the "Count" value to zero. That is, the first super peer R1 may register the first edge peer P1 as its child edge peer in response to a request from the first edge peer P1. Also, the first super peer R1 may transmit a message with a predetermined format at regular time intervals to recognize nearby peers and to recognize peers responding to the message as its child edge peers.

If the first edge peer P1 transmits a query for requesting a resource stored in the second edge peer P2 to the first super peer R1, the first super peer R1 generates R1 history information for the first edge peer P1. That is, the first super peer R1 generates R1 history information by writing the name, IP address, and port of the first edge peer P1 under a "Request" area, writing the name, IP address, and port of the second edge peer P2 under a "Destination" area, and initializing a count value of a "Count" area to zero. Here, the first super peer R1 may extract an index value matching the resource information requested by the first edge peer P1 according to a hash function and search for a super peer possessing the requested resource information based on the index value. The first super peer R1 may determine that the second edge peer P2 stores the resource information based on information provided by the searched super peer. Meanwhile, the P2P network may store resources included in the edge peers in a predetermined table so that each edge peer may search for desired resource information. That is, each super peer of the P2P network classifies and distributes resource information stored in connected edge peers connected based on predetermined keywords and manages the keywords in a table. Accordingly, if the first edge peer P1 requests a resource to a certain super peer, the super peer extracts a keyword corresponding to the requested resource and searches for a super peer matching the keyword based in a stored table. The first super peer R1 may recognize the second edge peer P2 and resources stored in the second edge peer P2 based on a query from the first edge peer P1, the first edge peer P1 searching for the resource.

Also, if the first edge peer P1 stores a specific resource as a child edge peer of the first super peer R1, the first super peer R1 may inform the second, third and fourth super peers R2, R3 and R4 that the first edge peer P1 is registered with the first super peer R1. The first super peer R1 generates resource information based on resources stored in the first edge peer P1, and classifies the resource information to predetermined index values using the hash function. And, the first super peer R1 transfers the resource information and index values to a super peer which manages the classified index values.

Through these operations, if the first edge peer P1 is registered and connected with the first super peer R1, the first super peer R1 classifies and distributes the resources of the first edge peer P1, and generates and manages R1 history information corresponding to log data searched for by the edge peer P1.

The first and second super peers R1 and R2 transfer history information (e.g., R1 history information and R2 history information) regarding their edge peers to their child edge peers at regular time intervals, thereby backing up information in case they are eliminated or their child edge peers move.

The process of generating history information as described above is described in more detail with reference to FIG. 3. In the following description, a resource searched for by a first edge peer P1 is stored in a second edge peer P2, resource information for resources of the second edge peer P2 is managed by a second super peer R2, and resource information managed by the second super peer R2 is shared with the first super peer R1. Here, resource sharing of the first and second super peers R1 and R2 may be based on indexing using the hash function.

Referring to FIG. 3, the first edge peer P1 generates a query for requesting a specific resource and transmits it to the first super peer R1 (operation S101). The first super peer R1 extracts an index value matching the resource information searched for by the first edge peer P1 based on the query. The first super peer R1 recognizes the second super peer R2 possessing the requested resource according to the index value, and transmits a query for requesting the resource to the second super peer R2 (operation S103).

The second super peer R2 determines that the resource requested by the first edge peer P1 is stored in the second edge peer P2, based on the query, and informs the second edge peer P2 that the first edge peer P1 is searching for the resource (operation S105). The second edge peer P2 transmits the resource to the first edge peer P1 (operation S107). For resource transmission, the second edge peer P2 may receive address information of the first edge peer P1 from the second super peer R2. That is, the address information of the first edge peer P1 is transmitted from the first super peer R1 to the second super peer R2 to the second edge peer P1.

In operation S105, the second super peer R2 generates and stores R2 history information for the first and second edge peers P1 and P2. The first edge peer P1 receives the resource from the second edge peer P2 and generates and stores P1 history information (for example, including the name, IP address, and port of the second edge peer P2) for the second edge peer P2 (operation S107).

The first edge peer P1 informs the first super peer R1 that it has received the resource from the second edge peer P2 (operation S109). The first super peer R1 generates R1 history information based on information of the first and second edge peers P1 and P2 (operation S111). In response to allowing the first super peer R1 to generate the R1 history information, the first edge peer P1 may transmit information regarding the name, IP address, and port of the second edge peer P2 to the first super peer R1.

The first and second super peers R1 and R2 may transfer R1 and R2 history information to the first and second edge peers P1 and P2 at regular time intervals to back up the R1 and R2 history information at regular time intervals (operation S113). The first and second edge peers P1 and P2, having received the R1 and R2 history information, may be elected as new super peers when the corresponding super peers are eliminated or move. If a plurality of edge peers are registered and connected with a super peer, the super peer may back up its history information to an edge peer with a high degree of physical performance among the edge peers (e.g., instead of to all its interconnected edge peers), for example, to a portable integrated terminal such as a PDA with a higher degree of performance than a mobile phone, a personal desktop computer with a higher degree of performance than such a portable integrated terminal, or a server computer with a higher degree of performance than such a personal desktop computer. Devices that may be elected as a new super peer when a super peer is eliminated are not limited to the above-mentioned examples.

The first edge peer P1, the first super peer R1, the second super peer R2 and the second edge peer P2 may manage their history information by deleting the oldest history information periodically or whenever an event occurs (for example, whenever another history information item is added due to resource searching) (operation S115).

Here, information regarding a path through which a specific edge peer searches for resources may be stored in history information of peers of the P2P network.

Figure 5:
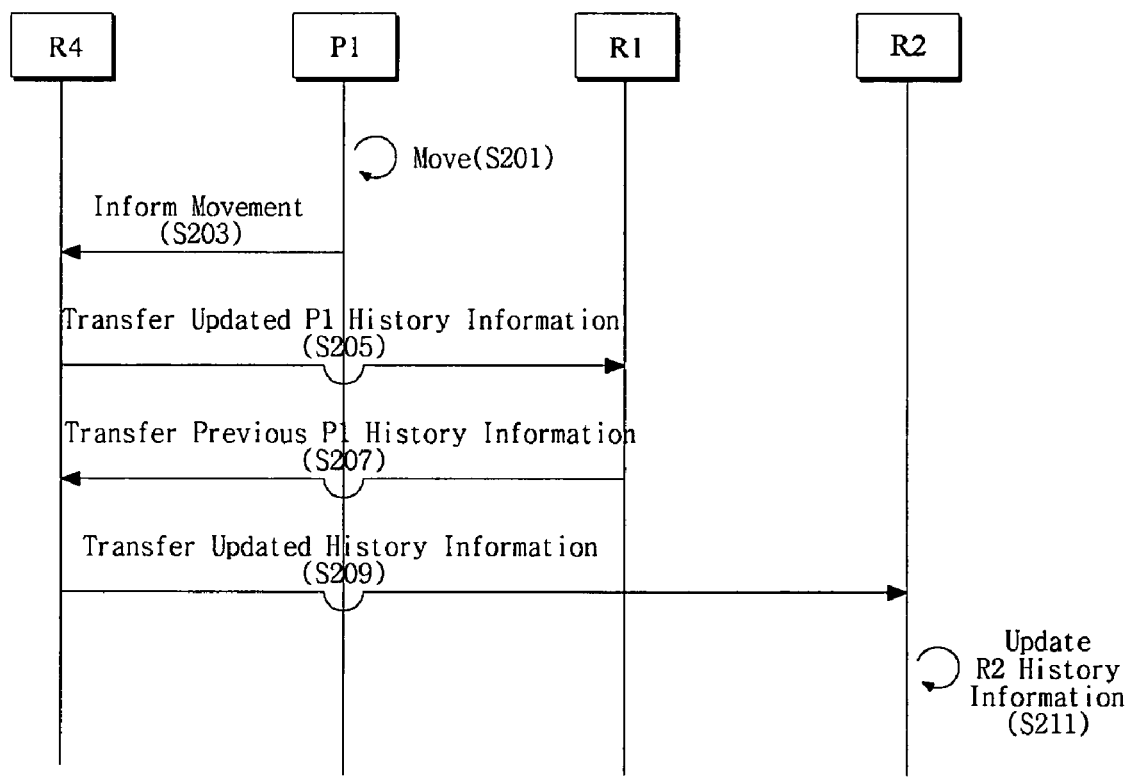
FIG. 5 illustrates exemplary signal flow in a network configuration for describing updating of history information when a request edge peer moves.

FIGS. 4 and 5 are views for explaining an exemplary operation of updating history information when a request edge peer P1 searching for a resource moves in the P2P network.

In the following description, the first edge peer P1 is registered and connected with a first super peer R and searches for and receives a resource from a second edge peer P2, the second super peer R2 manages the second edge peer P2, and a fourth super peer R4 has a communication region in which the first edge peer P1 may be registered and connected with the fourth super peer R4.

As illustrated in FIGS. 4 and 5, the first edge peer P1 registered and connected with the first super peer R1 migrates to a communication region of the fourth super peer R4 (operation S201).

The first edge peer P1 may be unregistered and disconnected from the first super peer R1 and registered and connected with the fourth super peer R4, according to, for example, reception sensibility. between the first and fourth super peers R1 and R4. That is, if the first edge peer P1 migrates to a communication region of the fourth super peer R4, a hand-over occurs as the first edge peer P1 receives signals from the fourth super peer R4 with better reception sensibility than the first super peer R1.

The first edge peer p1 is registered and connected with the fourth super peer R4 (operation S203). Also, the first edge peer P1 informs the fourth super peer R4 that it enters a communication region of the fourth super peer R4. For example, the first edge peer P1 transmits a message indicating that it enters the communication region of the fourth super peer R4 to the fourth super peer R4, and the fourth super peer R4 recognizes the first edge peer P1 when receiving the message. As another example, when the fourth super peer R4 receives from the first edge peer P1 a response for a message transmitted periodically by the fourth super peer R4 to peers within its communicable region, the fourth super peer R4 may recognize the first edge peer P1.

The fourth super peer R4 transmits updated P1 history information for the first edge peer P1 to the first super peer R1 (operation S205). For the history information transmission, the fourth super peer R4 may receive information (e.g., name, IP address, and port) regarding the first super peer R1 with which the first edge peer P1 was previously registered and connected, from the first edge peer P1.

When the first super peer R1 receives the updated P1 history information for the first edge peer P1 from the fourth super peer R4, the first super peer R1 determines that the first edge peer P1 has migrated to the fourth super peer R4. The first super peer R1 may update R1 history information for the first edge peer P1. Here, the first super peer R1 may delete information regarding the connection between the first super peer R1 and first edge peer P1. The first super peer R1 transfers, to the fourth super peer R4, previous P1 history information regarding that the first edge peer P1 has searched for resource information of the second super peer R2 (operation S207).

The fourth super peer R4 extracts information (e.g., name, IP address and port) regarding the second super peer R2 from the previous P1 history information, and updates the P1 history information for the first edge peer P1. The updated P1 history information is also transferred to the second super peer R2 (operation S209). The second super peer R2 updates its R2 history information based on the updated P1 history information (operation S211).

As described above, the operation of updating history information when a request edge peer moves recognizes the location of the request edge peer and maintains a path from the request edge peer to a destination edge peer.

Figure 6:
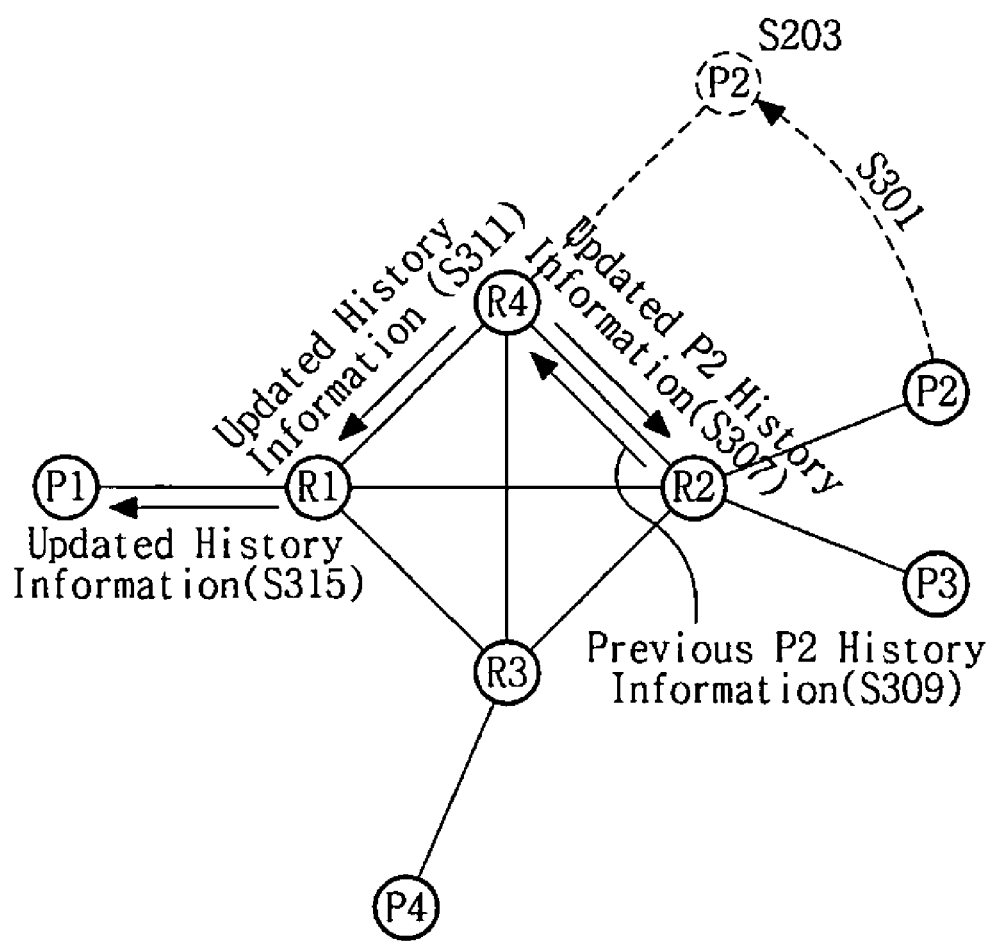
FIG. 6 illustrates an exemplary network configuration for describing updating of history information when a destination edge peer moves.
Figure 7:
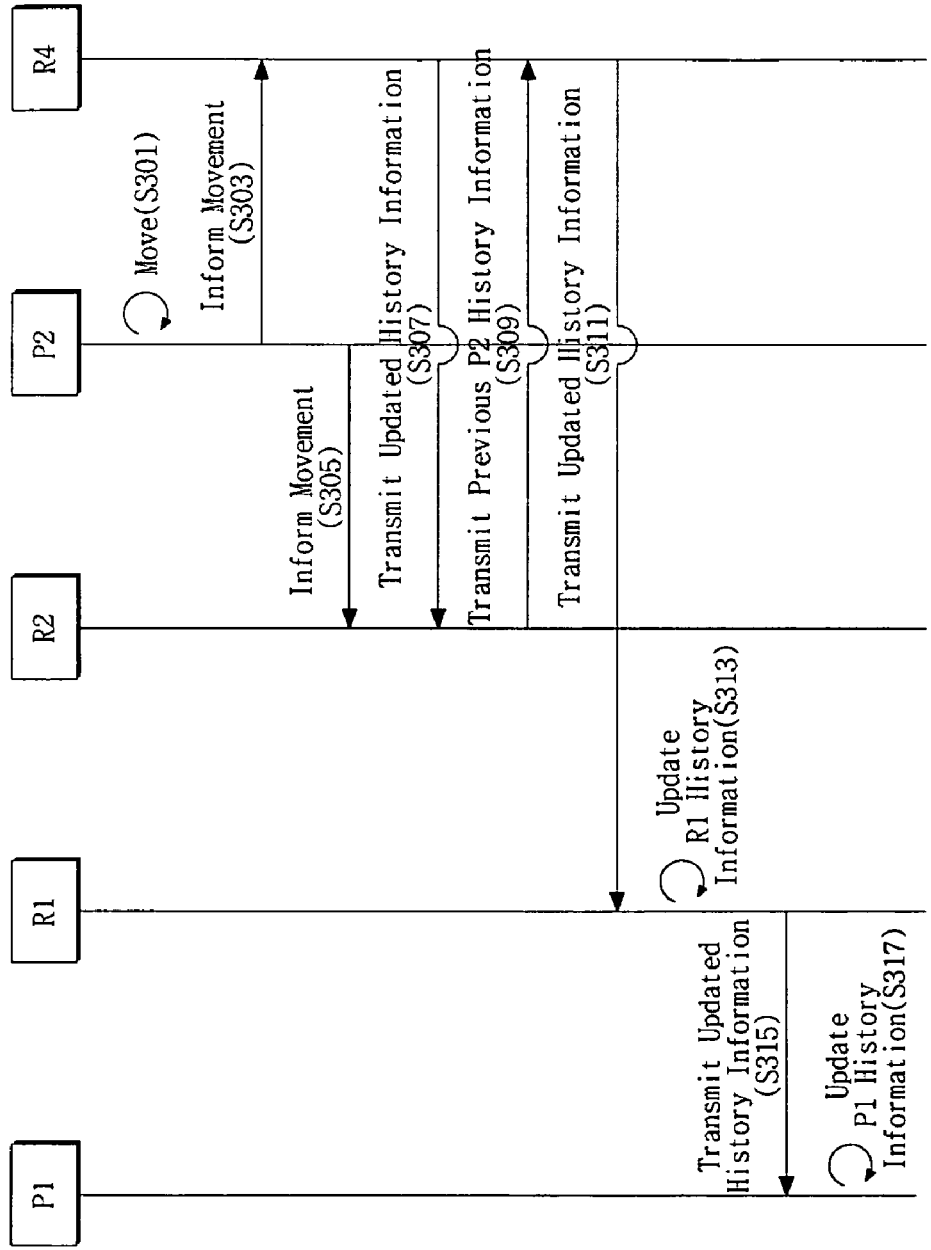
FIG. 7 illustrates exemplary signal flow in a network configuration for describing updating of history information when a destination edge peer moves.

FIGS. 6 and 7 are views for explaining an exemplary operation of updating history information when a destination edge peer moves.

In the following description, a first edge peer P1 has transmitted a query to a first super peer R1 and has received a certain resource from a second edge peer P2 via a second super peer R2. Accordingly, the first super peer R1 may generate R1 history information, history information regarding that the first edge peer P1 has searched for the resource of the second edge peer P2.

Referring to FIGS. 6 and 7, the second edge peer P2 moves (operation S301). For example, the second edge peer P2 is a mobile terminal and moves when a user possessing the mobile terminal P2 moves. If the second edge peer P2 enters a communication region of a fourth super peer R4, the second edge peer P2 is registered and connected with the fourth super peer 4 through a hand-over. Here, the hand-over, as described above, may be a series of processes for moving to the fourth super peer R4, the fourth super peer R4 having better reception sensibility than the second super peer R2.

If the second edge peer P2 enters the communication region of the fourth super peer R4, the second edge peer P2 informs the fourth super peer R4 that the second edge peer P2 enters the communication region of the fourth super peer R4 (operation S303). Here, the second edge peer P2 may inform the fourth super peer R4 by transferring to the fourth super peer R4 a response for a message transmitted periodically from the fourth super peer R4.

If the second super peer R2 manages resource information of the second edge peer P2, the second edge peer P2 may inform the second super peer R2 that the second edge peer P2 has migrated to the fourth super peer R4 (operation S305). Thus, the second super peer R2 may support the second edge peer P2 so that the second edge peer P2 may find a path through which it reaches corresponding resources upon resource searching. If a third super peer R3 manages resource information of the second edge peer P2, the second edge peer P2 may inform the third super peer R3 that the second edge peer P2 has migrated to the fourth super peer R4, and the third super peer R3 may recognize the migration of the second edge peer P2 and update a resource information management table regarding the second edge peer P2 based on information for the fourth super peer R4.

The fourth super peer R4 transmits updated P2 history information for the second edge peer P2 to the second super peer R2 (operation S307). The second super peer R2 recognizes that the second edge peer P2 has migrated to the communication region of the fourth super peer R4, and transmits previous P2 history information for the second edge peer P2 to the fourth super peer R4 (operation S309). The fourth super peer R4 updates its P2 history information based on the previous P2 history information. The fourth super peer R4 extracts information (name, IP address, and port) regarding the first edge peer P1 from the previous P2 history information, writes the extracted information under the "Request" area of the P2 history information and writes second information (name, IP address, and port) regarding the second edge peer P2 under the "Destination" area of the P2 history information, thereby updating the P2 history information.

The updated P2 history information is transferred to the first super peer R1 (operation S311). The first super peer R1 recognizes that the second edge peer P2 has migrated to the fourth super peer R4 from the updated P2 history information, extracts changed information for the second edge peer P2 from the updated P2 history information, and updates its R1 history information (operation S313).

The first super peer R1 transmits the updated R1 history information to the first edge peer P1 (operation S315). The first edge peer P1 updates its P1 history information based on the updated R1 history information (operation S317). That is, the first edge peer P1 extracts the name, IP address, and port of the second edge peer P2 from the updated R1 history information, and updates its P1 history information based on the extracted information.

The operation of updating history information when a destination edge peer moves recognizes the location of the destination edge peer and performs resource searching stably without repeatedly performing path-searching repeatedly.

Figure 8:
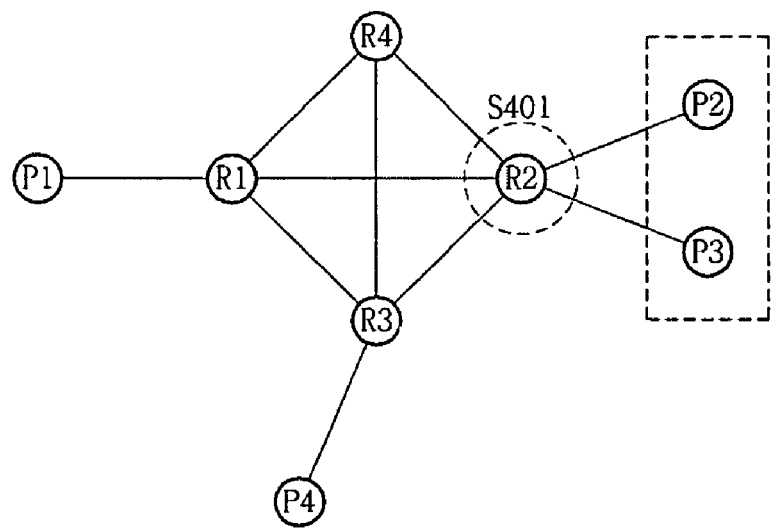
FIGS. 8 and 9 illustrate exemplary network configurations for describing updating of history information when a super peer is eliminated.
Figure 9:
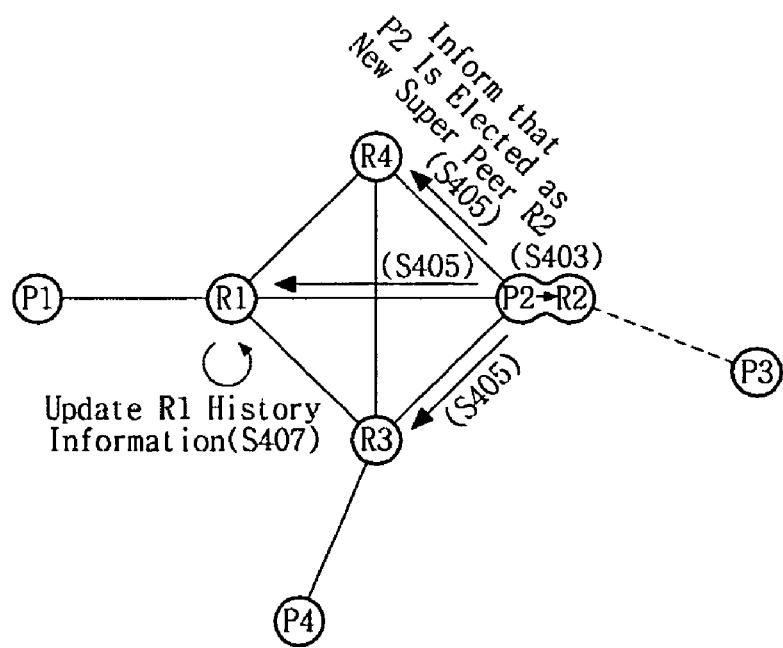

FIGS. 8 and 9 are views for explaining updating of history information when a super node is eliminated.

In the following description, a second super peer R2 no longer acts as a super peer due to elimination or movement, and a second edge peer P2 registered and connected with the second super peer R2 is elected as a new super peer. Electing a new super peer may be performed by peers connected to an eliminated super peer exchanging information regarding their physical performance and electing a peer with the highest physical performance as a new super peer. However, electing a new super peer may be performed by one of various methods, such as electing a predetermined peer as a new super peer or electing as a new super peer a peer storing information regarding peers located near the eliminated second super peer R2.

Also, in the following description, a first edge peer P1 has transmitted a query to a first super peer R1 and received resources from the second edge peer P2 via the second super peer R2. Accordingly, the first super peer R1 may generate R1 history information, which is history information regarding that the first edge peer P1 has searched for resources of the second edge peer P2.

Referring to FIG. 8, the second super peer R2 is eliminated for one of various reasons (operation S401). The various reasons include, for example, the cut-off of power to the second super peer R2, or movement of the second super peer R2. The second super peer R2 may back up its history information by transmitting the history information to second and third edge peers P2 and P3, as described above in operation S113 of FIG. 3. Also, in operation S113, the second super peer R2 may transfer, in addition to backing up the history information, information obtained by resource sharing with the first, third and fourth super peers R1, R3 and R4, to the second and third edge peers P2 and P3. As described above, if resource information is classified and distributed as index values to the first through fourth super peers R1 through R4 by a hash function, the second super peer R2 may back up index values managed by itself to the second and third edge peers P2 and P3. If the second and third edge peers P2 and P3 are disconnected from the second super peer R2 due to elimination of the second super peer R2, peers connected with the second super peer R2 are searched for from among peers located near the second super peer R2. If only the second and third peers P2 and P3 are searched for as peers connected with the second super peer R2, one of the second and third edge peers P2 and P3 is elected as a new second super peer according to predetermined criteria (for example, according to physical performance).

If the second edge peer P2 is elected as a new second super peer R2 (operation S403), the new second super peer R2 informs the first, third and fourth super peers R1, R3 and R4 that the second edge peer P2 has been elected as a new second super peer R2 (operation S405). Accordingly, the first, third and fourth super peers R1, R3 and R4 update their history information for the second new super peer R2. In particular, the first super peer R1 may update its R1 history information (operation S407).

When a certain super peer is eliminated, one of the edge peers connected with the eliminated super peer is elected as a new super peer, and history information is updated according to information previously backed up from the eliminated super peer.

The methods described above may be recorded, stored, or fixed in one or more computer-readable media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A peer-to-peer (P2P) network system comprises:
   at least one edge peer for storing resources; and
   at least one super peer for classifying resource information for the resources of the at least one edge peer, for distributing the classified resource information, and for managing the distributed resource information,
   wherein the at least one edge peer is registered and connected with the at least one super peer, the at least one super peer generates super peer history information to be used to search for resources that comprise information regarding a request edge peer and a destination edge peer, when the request edge peer requests a resource from the destination edge peer connected to the at least one super peer, and the resource is stored in the at least one edge peer, and
   wherein the super peer history information comprises a count area for storing a count value, the count value representing a frequency at which the super peer history information is generated when the request edge peer requests the resource.

2. The P2P network system of claim 1, wherein the super peer history information comprises:
   an address information area of the request edge peer for storing a name and an address of the request edge peer; and
   an address information area of the destination edge peer for storing a name and an address of the destination edge peer.

3. The P2P network system of claim 2, wherein the at least one super peer verifies the count value of every component of the super peer history information at a regular time interval, and deletes the component of the super peer history information having a smallest count value.

4. The P2P network system of claim 2, wherein
   the address information area of the request edge peer comprises an IP address and port address of the request edge peer, and
   the address information area of the destination edge peer comprises an IP address and port address of the destination edge peer.

5. The P2P network system of claim 1, wherein the at least one super peer transmits, at a regular time interval, stored super peer history information to the at least one edge peer.

6. The P2P network system of claim 1, wherein the request edge peer generates:
   edge peer history information comprising a name, an IP address, and a port address of the destination edge peer; and
   a count value representing a number of frequencies at which the request edge peer requests the resource from the destination edge peer.

7. The P2P network system of claim 6, wherein the at least one edge peer verifies the count value of every component of the edge peer history information at a regular time interval and deletes the component of the edge peer history information having a smallest count value.

8. The P2P network system of claim 1, wherein when the request edge peer is unregistered and disconnected from a previous super peer with which the request edge peer was previously registered and connected and then is registered and connected with another super peer, edge peer history information of the destination edge peer, history information of the previous super peer, and history information of the other super peer are updated.

9. The P2P network system of claim 1, wherein when the destination edge peer is unregistered and disconnected from a previous super peer with which the destination edge peer was previously registered and connected and then is registered and connected with another super peer, edge peer history information of the request edge peer, history information of a super peer with which the request edge peer is registered and connected, edge peer history information of the destination edge peer, history information of the previous super peer, and history information of the other super peer are updated.

10. The P2P network system of claim 1, wherein when a super peer of the at least one super peer no longer manages edge peers connected with the super peer, at least one edge peer of the edge peers connected with the super peer is elected as a new super peer and history information of a super peer connected with the new super peer is updated.

11. A method of operating a peer-to-peer (P2P) network system comprising:
   at least one edge peer, for storing resources, being registered and connected with at least one super peer, wherein the at least one super peer classifies resource information for the resources of the at least one edge peer, distributes the classified resource information with each other, and manages the distributed resource information;

a request edge peer among the at least one edge peer for transmitting a query for requesting a resource to a destination edge peer storing the resource, through a request super peer with which the request edge peer is connected and a destination super peer with which the destination edge peer is connected and which manages the destination edge peer; and the request super peer and the destination super peer generate and store super peer history information to be used to search for the resources that include information regarding a request edge peer and a destination edge peer, when the resource is requested, based on the query from the request edge peer to the destination edge peer, wherein the generating and storing of the super peer history information comprises writing a count value representing a frequency at which the super peer history information is generated when the request edge peer requests the resource.

12. The method of claim 11, wherein the generating and storing of the super peer history information comprises:
    writing address information of the request edge peer, comprising a name and an address of the request edge peer; and
    writing address information of the destination edge peer, comprising a name and an address of the destination edge peer.

13. The method of claim 12, further comprising:
    the at least one super peer verifies the count value of every component of the super peer history information at a regular time interval; and
    the at least one super peer deletes the component of the super peer history information having a smallest count value.

14. The method of claim 12, wherein:
    the address information of the request edge peer comprises an IP address and a port address of the request edge peer, and
    the address information of the destination edge peer comprises an IP address and a port address of the destination edge peer.

15. The method of claim 11, wherein the at least one super peer transmits, at a regular time interval, stored super peer history information to the at least one edge peer.

16. The method of claim 11, wherein the request edge peer generates edge peer history information for the destination edge peer.

17. The method of claim 16, wherein the generating of the edge peer history information comprises the request edge peer performing at least one selected from the group consisting of:
    writing a name of the destination edge peer;
    writing an IP address of the destination edge peer;
    writing a port address of the destination edge peer;
    writing a count value representing a frequency at which the edge peer history information is generated when the request edge peer requests the resource; and
    any combination thereof.

18. The method of claim 17, wherein the at least one edge peer verifies the count value of every component of the edge peer history information at a regular time interval, and deletes the component of the edge peer history information having a smallest count value.

19. The method of claim 11, further comprising:
    when the request edge peer is unregistered and disconnected from a previous super peer with which the request edge peer was previously registered and connected and then is registered and connected with another super peer, updating edge peer history information of the destination edge peer, history information of the previous super peer, and history information of the other super peer.

20. The method of claim 11, further comprising when the destination edge peer is unregistered and disconnected from a previous super peer with which the destination edge peer was previously registered and connected and then is registered and connected with another super peer, updating edge peer history information of the request edge peer, history information of a super peer with which the request edge peer is registered and connected, edge peer history information of the destination edge peer, history information of the previous super peer, and history information of the other super peer.

21. The P2P network system of claim 1, wherein the resource information comprises names of the resources of the at least one edge peer and identifiers of locations at which the resources of the at least one edge peer are stored.

22. The P2P network system of claim 1, wherein:
    the request edge peer informs the at least one super peer that the request edge peer has received the resource from the destination edge peer;
    the at least one super peer generates the super peer history information after being informed that the request edge peer has received the resource; and
    the at least one super peer transmits the generated super peer history information to the request edge peer.

23. The method of claim 11, wherein:
    the request edge peer informs the request super peer that the request edge peer has received the resource from the destination edge peer;
    the request super peer generates the super peer history information after being informed that the request edge peer has received the resource; and
    the request super peer transmits the generated super peer history information to the request edge peer.

* * * * *